(12) United States Patent
Furodet et al.

(10) Patent No.: US 7,860,712 B2
(45) Date of Patent: Dec. 28, 2010

(54) METHOD OF STORING DATA IN A MEMORY CIRCUIT FOR AHO-CORASICK TYPE CHARACTER RECOGNITION AUTOMATON AND CORRESPONDING STORAGE CIRCUIT

(75) Inventors: David Furodet, Pontcharra (FR); Nicolas Albarel, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 1075 days.

(21) Appl. No.: 11/555,888

(22) Filed: Nov. 2, 2006

(65) Prior Publication Data

US 2007/0104375 A1 May 10, 2007

(30) Foreign Application Priority Data

Nov. 3, 2005 (FR) .................................. 05 11202

(51) Int. Cl.
*G06K 9/18* (2006.01)
*G06F 12/02* (2006.01)

(52) U.S. Cl. .................. 704/231; 707/797; 382/182
(58) Field of Classification Search ................ 704/222, 704/231; 707/715, 797; 726/24; 382/182
See application file for complete search history.

(56) References Cited

U.S. PATENT DOCUMENTS

| | | | | |
|---|---|---|---|---|
| 4,376,932 A | * | 3/1983 | Cassada | 382/216 |
| 5,140,644 A | | 8/1992 | Kawaguchi et al. | 382/10 |
| 5,151,950 A | * | 9/1992 | Hullender | 382/187 |
| 5,369,577 A | * | 11/1994 | Kadashevich et al. | 704/9 |
| 5,392,363 A | * | 2/1995 | Fujisaki et al. | 382/187 |
| 5,754,695 A | * | 5/1998 | Kuo et al. | 382/228 |
| 5,943,443 A | * | 8/1999 | Itonori et al. | 382/225 |
| 5,995,963 A | * | 11/1999 | Nanba et al. | 707/999.006 |
| 6,677,932 B1 | * | 1/2004 | Westerman | 345/173 |
| 7,103,596 B2 | * | 9/2006 | Abe et al. | 707/999.007 |
| 7,222,129 B2 | * | 5/2007 | Kuboyama et al. | 707/E17.005 |
| 7,359,895 B2 | * | 4/2008 | Chang et al. | 707/999.003 |
| 7,420,987 B1 | * | 9/2008 | Basu et al. | 370/462 |
| 7,539,681 B2 | * | 5/2009 | Norton et al. | 714/48 |

(Continued)

OTHER PUBLICATIONS

Dimopoulos et al., "A Memory-Efficient Reconfigurable Aho-Corasick FSM Implementation for Intrusion Detection Systems", International Conference on Embedded Computer Systems: Architectures, Modeling and Simulation, 2007. IC-SAMOS 2007, pp. 186 to 193.*

(Continued)

*Primary Examiner*—Martin Lerner
(74) *Attorney, Agent, or Firm*—Lisa K. Jorgenson; Allen, Dyer, Doppelt, Milbrath & Gilchrist, P.A.

(57) ABSTRACT

A method of storing data in a memory circuit of an Aho-Corasick type character recognition automaton recognizes character strings by implementing successive transitions in a tree of nodes stored in a memory. Each node corresponds to a state of the automaton and to a recognition of a sequence of the character string. Each node is associated with a transition vector serves to determine the destination node or nodes of a transition. For storage of the data, a test is performed to find out whether transition vectors point to common destination addresses. The transition vectors are combined if the addresses to which the vectors point are separate by formulating a combination vector and the nodes are stored at the memory addresses pointed at by the combination vector.

33 Claims, 5 Drawing Sheets

U.S. PATENT DOCUMENTS

| | | | |
|---|---|---|---|
| 2003/0033278 A1* | 2/2003 | Abe et al. | 707/1 |
| 2003/0187856 A1* | 10/2003 | Luk et al. | 707/100 |
| 2003/0187877 A1* | 10/2003 | Kuboyama et al. | 707/104.1 |
| 2004/0103086 A1* | 5/2004 | Vinnakota et al. | 707/3 |
| 2006/0004744 A1* | 1/2006 | Nevidomski et al. | 707/4 |
| 2007/0075878 A1* | 4/2007 | Furodet et al. | 341/50 |

OTHER PUBLICATIONS

Tuck et al., Deterministic Memory-Efficient String Matching Algorithms for Intrusion Detection, Infocom 2004, Twenty-Third Annual Joint Conference of the IEEE Computer and Communications Societies Hong Kong, China, Mar. 7-11, 2004, vol. 4, Mar. 7, 2004, pp. 2628-2639.

Tarjan et al., Storing a Sparse Table, Communications of the ACM, vol. 22, No. 11, Nov. 1979, pp. 606-611.

Aho et al., Efficient String Matching: An Aid to Bibliographic Search, Communications of the Association for Computing Machinery, ACM, New York, vol. 19, No. 6, Jun. 1975, pp. 333-340.

* cited by examiner

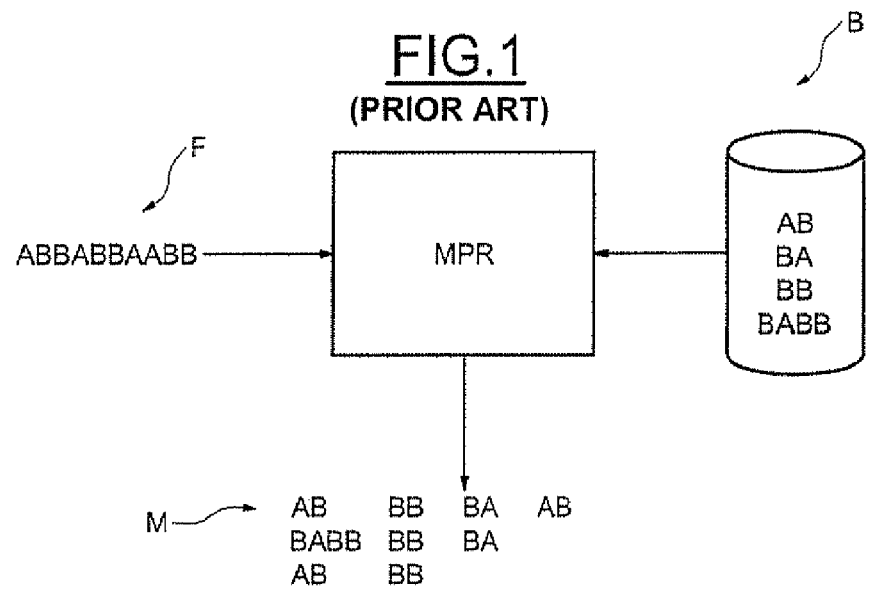
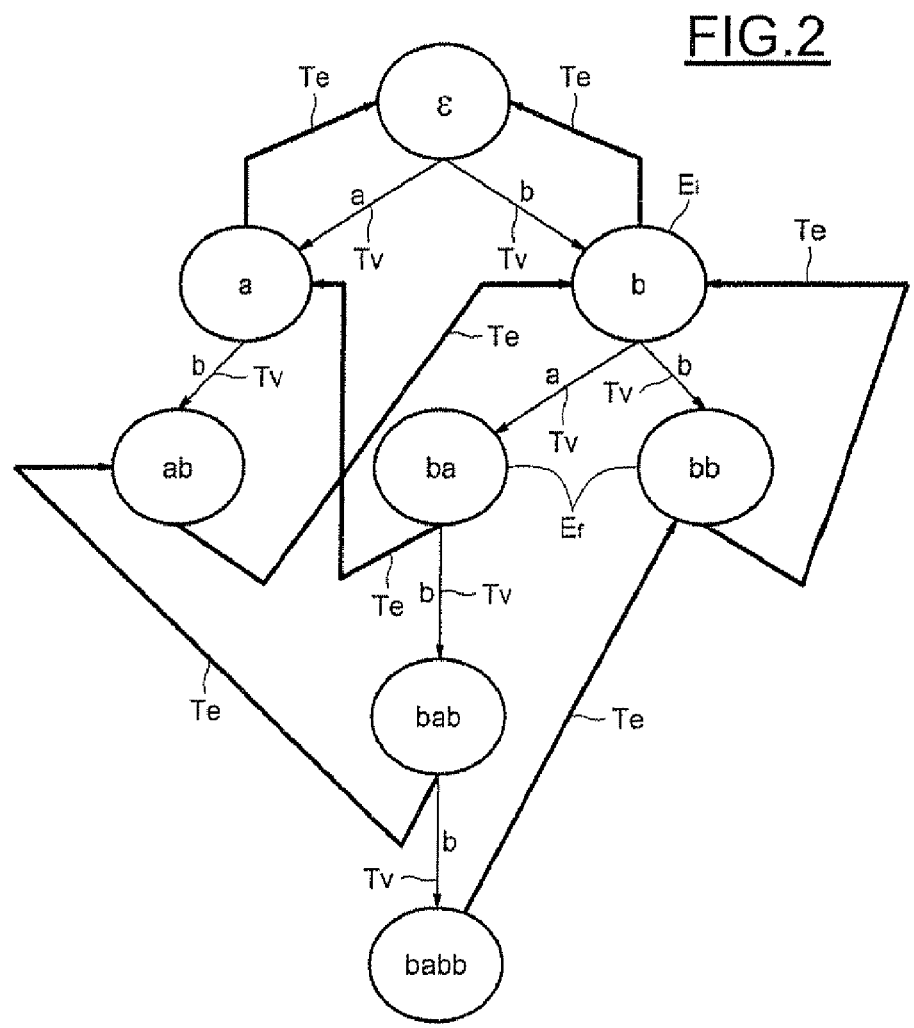

| States | Trans. Vectors $V_{si}$ | Density |
|---|---|---|
| $\varepsilon$ | 10110101 | 5 |
| $S_0$ | 10010001 | 3 |
| $S_1$ | 01000000 | 1 |
| $S_2$ | 00101000 | 2 |
| $S_3$ | 11000100 | 3 |
| $S_4$ | 00000010 | 1 |

| $AV_0$ = 10110101 | $V\varepsilon \otimes$ x AND $AV_0$ | |
|---|---|---|
| $V\varepsilon \otimes 0$ = 10110101 | 00000000 | Aggregation T=0 S=0 $AV_0$ = 10110101 |

| $AV_0$ = 10110101 | $V_{S_0} \otimes$ x AND $AV_0$ | |
|---|---|---|
| $V_{S_0} \otimes 0$ = 10010001 | 10010001 | |
| $V_{S_0} \otimes 0$ = 11001000 | 10000000 | |
| $V_{S_0} \otimes 0$ = 01100100 | 00100100 | |
| $V_{S_0} \otimes 0$ = 00110010 | 00110000 | |
| $V_{S_0} \otimes 0$ = 00011001 | 00010001 | |
| $V_{S_0} \otimes 0$ = 10001100 | 10000100 | |
| $V_{S_0} \otimes 0$ = 01000110 | 00000100 | |
| $V_{S_0} \otimes 0$ = 00100011 | 00100001 | Aggregation imp. |

FIG.9

| $AV_1 = 00000000$ | $V_{S0} \otimes x$ AND $AV_1$ | |
|---|---|---|
| $V_{Sn} \otimes 0 = 10010001$ | 00000000 | Aggregation T=1 S=0 $AV_1 = 10010001$ |

FIG.10

| $AV_0 = 10110101$ | $V_{S3} \otimes x$ AND $AV_1$ | |
|---|---|---|
| $V_{S3} \otimes 0 = 11000100$ | 10000100 | |
| $V_{S3} \otimes 1 = 01100010$ | 00100000 | |
| $V_{S3} \otimes 2 = 00110001$ | 00110001 | |
| $V_{S3} \otimes 3 = 10011000$ | 10010000 | |
| $V_{S3} \otimes 4 = 01001100$ | 00000100 | |
| $V_{S3} \otimes 5 = 00100110$ | 00100100 | |
| $V_{S3} \otimes 6 = 00010011$ | 00010001 | |
| $V_{S3} \otimes 6 = 10001001$ | 10000001 | Aggregation imp. |

FIG.11

| $AV_1 = 10010001$ | $V_{S3} \otimes x$ AND $AV_1$ | |
|---|---|---|
| $V_{S3} \otimes 0 = 11000100$ | 10000000 | |
| $V_{S3} \otimes 1 = 01100010$ | 00000000 | Aggregation T=1 S=1 $AV_1 = 11110011$ |

FIG.12

| $AV_0 = 10110101$ | $V_{S2} \otimes x$ AND $AV_0$ | |
|---|---|---|
| $V_{S2} \otimes 0 = 00101000$ | 00100000 | |
| $V_{S2} \otimes 1 = 00010100$ | 00010100 | |
| $V_{S2} \otimes 2 = 00001010$ | 00000000 | Aggregation T=0 S=2 $AV_0 = 1011111$ |

FIG.13

| $AV_0 = 10111111$ | $V_{S1} \otimes x$ AND $AV_0$ | |
|---|---|---|
| $V_{S1} \otimes 0 = 01000000$ | 00000000 | Aggregation T=0 S=0 $AV_0 = 1111111$ |

FIG.14

| AV$_1$ = 11110011 | V$_{S4}$ ⊗ x AND AV$_1$ | |
|---|---|---|
| V$_{S4}$ ⊗ 0 = 00000010 | 00000010 | |
| V$_{S4}$ ⊗ 1 = 00000001 | 00000001 | |
| V$_{S4}$ ⊗ 2 = 10000000 | 10000000 | |
| V$_{S4}$ ⊗ 3 = 01000000 | 01000000 | |
| V$_{S4}$ ⊗ 4 = 00100000 | 00100000 | |
| V$_{S4}$ ⊗ 5 = 00010000 | 00010000 | |
| V$_{S4}$ ⊗ 6 = 00001000 | 00000000 | Aggregation T=1 S=6 AV$_1$ = 11111011 |

FIG.15

| States | T,S | Daughter states |
|---|---|---|
| ε | 0,0 | S$_0$(a$_0$) S$_1$(a$_2$) S$_2$(a$_3$) S$_3$(a$_5$) S$_4$(a$_7$) |
| S$_0$ | 1,0 | S$_5$(a$_0$) S$_6$(a$_3$) S$_7$(a$_7$) |
| S$_1$ | 0,0 | S$_8$(a$_1$) |
| S$_2$ | 0,2 | S$_9$(a$_2$) S$_{10}$(a$_4$) |
| S$_3$ | 1,1 | S$_{11}$(a$_0$) S$_{12}$(a$_1$) S$_{13}$(a$_5$) |
| S$_4$ | 1,6 | S$_{14}$(a$_6$) |

FIG.16

| Segts | States |
|---|---|
| Δ(a$_0$) | S$_0$ |
|  | S$_5$ |
| Δ(a$_1$) | S$_8$ |
|  | S$_{11}$ |
| Δ(a$_2$) | S$_1$ |
|  | S$_{12}$ |
| Δ(a$_3$) | S$_2$ |
|  | S$_6$ |
| Δ(a$_4$) | S$_9$ |
|  | S$_{14}$ |
| Δ(a$_5$) | S$_3$ |
|  |  |
| Δ(a$_6$) | S$_{10}$ |
|  | S$_{13}$ |
| Δ(a$_7$) | S$_4$ |
|  | S$_7$ |

METHOD OF STORING DATA IN A MEMORY CIRCUIT FOR AHO-CORASICK TYPE CHARACTER RECOGNITION AUTOMATON AND CORRESPONDING STORAGE CIRCUIT

FIELD OF THE INVENTION

The invention relates to shape and character recognition, and more particularly, to a method of storing data in a memory circuit of a character recognition automaton. The invention also relates to such a memory circuit.

BACKGROUND OF THE INVENTION

An especially beneficial application of such a memory circuit relates to devising a database for an Aho-Corasick type final state deterministic character recognition automaton for recognizing multiple information or MPR, also known by the term multi-pattern recognition. For example, but not exclusively, the recognition of characters may be used in the field of computing to recognize signatures of computer viruses in intrusion detection systems in which known attack signatures are detected.

Referring to FIG. 1, a character recognition automaton MPR is therefore based on the use of a database B in which is stored a list of words, or in a general manner, a list of character strings or patterns to be recognized in an incoming file F. The patterns are stored in the database B in the form of a node tree in which each node corresponds to a state of the automaton and to a recognition of a sequence of characters of a pattern to be recognized.

The structure and the devising of an Aho-Corasick type automaton are well known to those skilled in the art, and are therefore not described in detail below. In this regard, reference is made to the article "A. Aho and M. Corasick: Efficient String Machine, An Aid To Bibliographic Search, in *Communications of the ACM*", 18 (6): 333-340, 1975.

The construction of an Aho-Corasick automaton first requires the devising of the database B by providing, for each pattern M to be recognized, the states and the direct transitions which lead to the recognition of the pattern. In particular, with each state is associated a transition vector which serves to determine the destination node or nodes of a transition.

To do this, with each state is associated transition parameters for calculating with a transition function the states accessible from each node. Devising the database is a very complex step to implement and requires relatively significant amounts of hardware, particularly in terms of memory. Thus, in an application for searching for computer virus signatures, the size of the memory required to implement an Aho-Corasick type automaton may attain, or even exceed, 100 MB,

SUMMARY OF THE INVENTION

An object of the invention is to alleviate the above noted drawback and to provide a method of storing data in a memory circuit of an Aho-Corasick type character recognition automaton, in which the memory size necessary for the formulation of the database may be considerably reduced.

According to a first aspect of the invention, a method of storing data in a memory circuit of an Aho-Corasick type character recognition automaton is provided, in which character strings are recognized by implementing successive transitions in a tree of nodes stored in memory. Each node may correspond to a state of the automaton and to a recognition of a sequence of the character string. Each node may be associated with a transition vector for determining the destination node or nodes of a transition.

According to a general characteristic, a test is performed to find out whether transition vectors point to common destination addresses. The transition vectors are combined if the addresses to which the vectors point are separate by formulating a combination vector, and the nodes are stored at the memory addresses pointed at by the combination vector.

Stated otherwise, in the case where two transition vectors have no destination state in common, the set of destination states may be merged into the same combination vector. The combination vector thus formulated is then assigned to two combined initial states so as to determine the destination states which respectively correspond to them.

According to another characteristic, the combination vector may be formulated by carrying out a logic OR between the vectors to be combined. The test to be used to determine whether the transition vectors point to common states is, for its part, carried out by performing an AND logic function between the vectors to be combined.

According to yet another characteristic, successive transformations of a first vector to be combined are carried out until a configuration of the first vector is obtained in which the states to which this vector points are different from the states to which a second vector to be combined points. Preferably, in the case where the configuration is not attained, the first vector is combined with another vector.

According to another characteristic, the transformation is an offset and a rotation of the bits of the vector.

For the storage of a node pointed at by the combination vector, each node may be associated in the memory with transition parameters serving to formulate the transition vectors on the basis of a transition function. The value of the transition parameters is thus modified as a function of the successive transformations of the vectors.

The states are then stored in the memory in the form of a set of segments of descriptors. Each segment corresponds to an input symbol and is addressable by a first transition parameter, and each vector is addressable by a second transition parameter representing the position of the vector in a segment.

According to yet another characteristic, each node may be associated with a confirmation key in the form of a set of coding bits for a parameter for verifying a transition. In a particular mode of implementation, a set of combination vectors is initialized by setting each bit of the vectors to 0 and each transition vector and each combination vector are combined successively. It has been found that this characteristic makes it possible to further reduce memory location.

According to another aspect, the subject of the invention is also directed to a memory circuit for an Aho-Corasick type character recognition automaton, in which character strings are recognized by implementing successive transitions in a tree of nodes stored in memory. Each node may correspond to a state of the automaton and to a recognition of a sequence of the character string and in which each node is associated with a transition vector serving to determine the destination node or nodes of a transition. At least some of the nodes may be stored in the memory at addresses corresponding to a combination of transition vectors.

BRIEF DESCRIPTION OF THE DRAWINGS

Other objects, characteristics and advantages of the invention will become apparent on reading the following description, given by way of non-limiting examples, and offered with reference to the appended drawings, in which:

FIG. 1 illustrates the general principle of a recognition of characters with an Aho-Corasick type recognition automaton in accordance with the prior art;

FIG. 2 is a schematic diagram showing an exemplary implementation of a base in a memory circuit in accordance with the invention;

FIG. 5 shows a particular exemplary implementation of an automaton in accordance with the invention;

FIG. 6 is a remote table, for each state, of the transition vectors in accordance with the invention;

FIGS. 7 to 14 show the steps of combining the vectors in accordance with the invention;

FIG. 15 is a remote summary table, for each state, of the destination states and the values of the transition parameters in accordance with the invention; and FIG. 16 is a table illustrating the memory organization of the states in accordance with the invention.

DETAILED DESCRIPTION OF THE PREFERRED EMBODIMENTS

Figure 3:
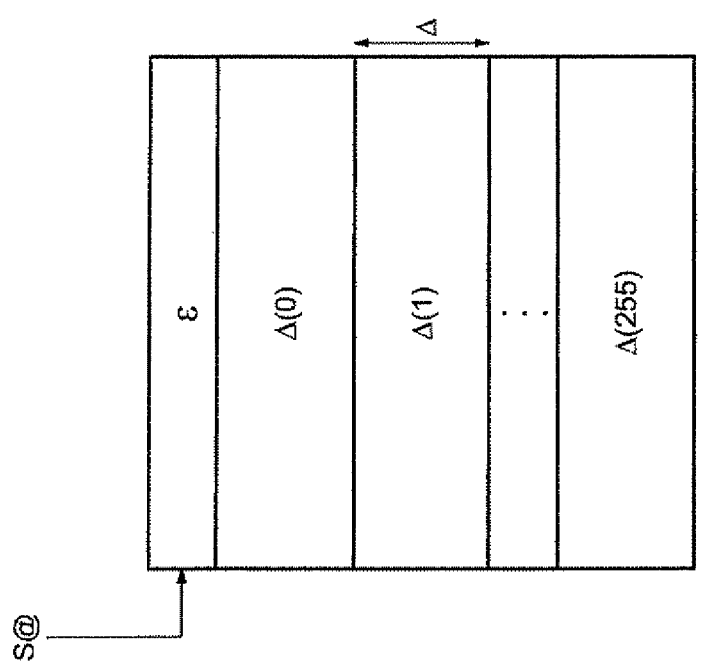
FIG. 3 illustrates the organization of the memory circuit for the storage of multiple nodes in accordance with the invention.

In FIG. 2, the memory circuit is organized in the form of a tree comprising a succession of nodes each corresponding to a state of an Aho-Corasick type character recognition automaton. That is, a state corresponding to a recognition of a sequence of characters of a pattern to be recognized in an incoming file is to be analyzed.

The nodes are interrelated by valid or direct transitions which lead to a final state corresponding to the recognition of a predetermined pattern. Thus, starting with an initial state e, each node points to one or more consecutive nodes in such a way as to reach a final state $E_F$ via intermediate states such as $E_i$ so as to declare a corresponding pattern retrieved. However, each node points via a valid transition only to one or several nodes of an immediately lower order. In the absence of a valid transition, failure transitions, illustrated in thick lines in FIG. 2, are provided so as to bring the automaton back to a predetermined preceding state.

In the architecture visible in FIG. 2, one distinguishes between multiple nodes, which point to several consecutive nodes, and strings of nodes whose nodes each point only to a single consecutive node. Each node arises from only one parent. The failure transitions make it possible to reach a multiple node only.

In the example illustrated in FIG. 2, the initial node ϵ is a multiple node which points to two consecutive nodes a and b. Likewise, the node designated by the reference b also constitutes a multiple node which points to several nodes such as ba and bb. The other nodes, particularly the node ba, are string nodes and point to a single node.

During construction of the memory circuit, the transitions between nodes are devised by constructing, on the one hand, valid transitions $T_v$ between two consecutive states which correspond to a chain of characters of the pattern to be recognized and, on the other hand, failure transitions $T_e$ implemented in case of non-recognition of a character in a given state.

In the example represented in FIG. 2, starting from an initial state ϵ, one proceeds to a transition of states with each incoming character. Thus, the entry of characters a or b makes it possible to attain the states a or b, respectively. From the state a, the receipt of a character b makes it possible to attain a final state ab, this corresponding to the recognition of the pattern ab.

From the state b, the receipt of the symbol a makes it possible to attain the final state ba, while the receipt of the character b makes it possible to attain the final state bb. Finally, from the state ba, the receipt of the character b makes it possible to attain an intermediate state bab, then the final state babb after receipt of the character b.

From each of the states mentioned above, in the absence of a valid transition, failure transitions $T_e$ make it possible to point to a predetermined earlier state using a predefined transition function, which will be described in detail below.

The nodes of each string of nodes constitute consecutive nodes accessible sequentially during the traversal of the tree and are implanted in memory at consecutive addresses on the basis of a base node and of a relative offset with respect to this base node.

Thus, the address of a node of a string of nodes is given by the following relation:

Address(offset)=C@+offset in which:

Address (offset) designates the address of a node separated from a base node by an offset; and C@ designates the address of the base node.

For the storage in memory of the multiple nodes, the memory circuit is divided into successive spaces of memory areas each corresponding to a symbol of an alphabet.

Referring to FIG. 3, the memory is, for example subdivided into A segments of Δ descriptors, A being, for example equal to 256 for an alphabet of 256 characters. Each segment comprises a series of consecutive descriptors. Each descriptor is associated with a given symbol of the alphabet, which describes the path which makes it possible to access the node in the tree, and which serves for calculating the destination nodes of a transition.

The multiple nodes are thus also stored in relation to the base node ϵ and their address may be calculated from the relation:

Address (s, offset)=S@+s×offset+1

Address (ϵ)=S@ in which:

Address (S, offset) designates the address of a multiple node spaced from an initial node ϵ by an offset;

S@ designates the address of the base node; and address (ϵ) corresponds to the address of the base node.

Figure 4:
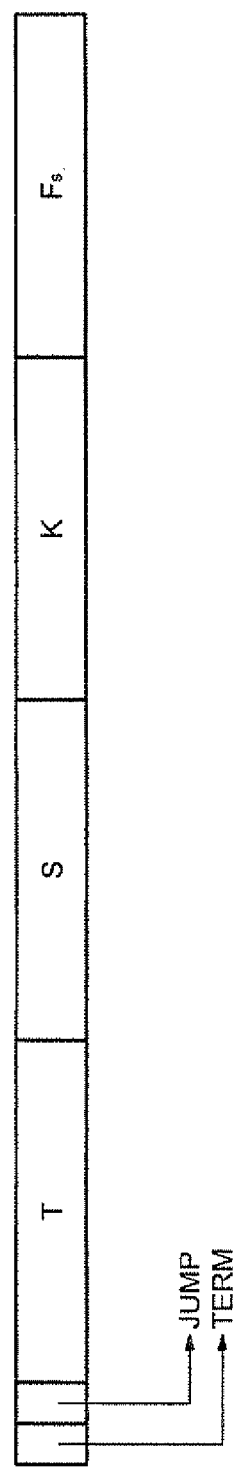
FIG. 4 is a schematic diagram illustrating an exemplary coding of nodes in a memory in accordance with the invention.

With the aim of reducing the memory size required for the storage of the strings of nodes and of multiple nodes, these nodes are coded in the following manner. Referring to FIG. 4, the coding of the multiple nodes is performed in the following manner.

These nodes are coded in the form of a frame of bits serving to determine a transition associated with each node. Each multiple node comprises a certain number of fields serving to determine a transition associated with the node. That is, one is to determine the destination state or node of a transition, and flags making it possible to describe the multiple node or the state associated with the node.

As far as the field serving to determine a transition is concerned, the field comprises two parameters T and S serving to calculate a transition function. A field K makes it possible to verify the validity of the transition thus calculated, and a field $F_s$ serves to point to a failure state in the memory.

The field T serves for the coding of a shift of the node in a segment and corresponds to the offset mentioned above. The field S serves for the coding of the shift of the segment considered with respect to the initial node ϵ.

The field K serves for the coding of a key to verify that the valid transition calculated with the help of the fields T and S is correct and corresponds to the address of the start node of the transition. Stated otherwise, a transition is verified to be correct if the key of the destination state indicates the preceding state. The field $F_s$ serves for the coding of the address of the failure state in the memory.

Moreover, two fields are used. JUMP: this field is a bit which indicates whether the multiple node points to a node of a string of nodes. TERM: this flag is a bit which indicates whether the state in progress is a final state or otherwise.

If the flag JUMP is set to 1, the destination state of the transition is constituted by a predetermined node of a string of nodes. The address is, for example calculated by concatenation of the fields T, S and $F_s$ so as to calculate an offset with respect to the address of a base node C@.

Conversely, if the flag JUMP is not set, the destination node of the transition is constituted by a multiple node and is calculated with the help of a transition function $G_s(a_i)$ with the help of the parameters T and S.

The destination address is then calculated on the basis of the following function:

$$G_s(a_i) = \Delta \cdot (a_i \oplus S) + T + 1$$

in which the operator $\oplus$ carries out an operation of addition modulo 256.

As indicated previously, the address contained in the key K of the destination vector is compared with the start address of the transition so as to validate the transition. For example, the determination of a transition may be implemented by an analyzer by way of the following algorithm:

```
State TRANS (State S, a_i)
{
if (JUMP)
{
offset = concat (T, S, F_s);
return C@ + offset; // Go to a string node.
}
//Next theoretical multiple node for the valid
transition.
    G_s (a_i) = Δ x (a_i ⊕ S) + T + 1;
    S' = S@ + G_s(a_i) x sizeof (multiple node);
    if (S' . K ≠ @(S)) return S@ + F_s x sizeof (super
node);
    else return @ (S').
```

With each node is therefore associated a set of nodes accessible sequentially on reception of respective input symbols. Each node is therefore associated with a transition vector which makes it possible to determine the set of possible transitions on the basis of the corresponding state. Thus, for example, in the example visible in FIG. 5, the following alphabet A is considered:

$$A = \{a_0, a_1, a_2, a_3, a_4, a_5, a_6, a_7\}$$

Figures 5, 6, 7, 8:
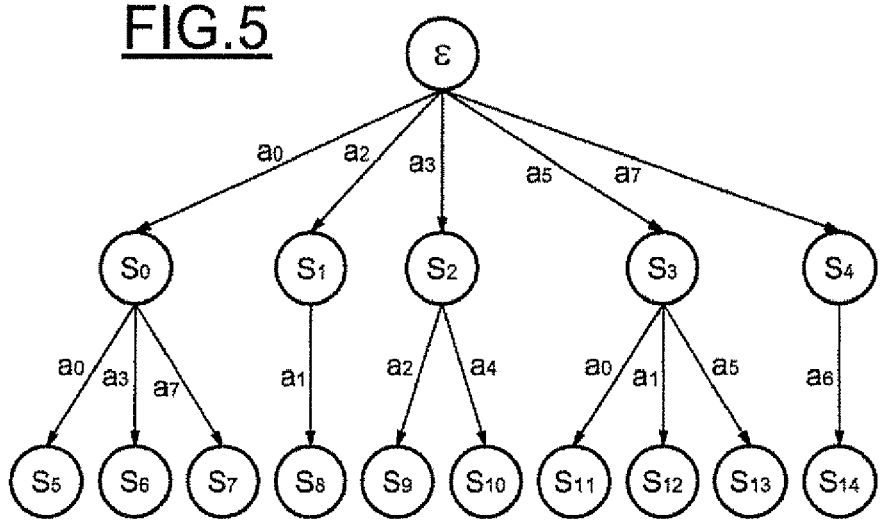

With each state are associated the transition vectors represented in FIG. 6, the density corresponds in this figure to the number of destination nodes of each state. In FIG. 6, a bit i of a vector=1 if and only if there exists a transition through the symbol i.

As may be appreciated, the storage in memory of the transition vectors requires relatively significant resources in terms of hardware storage means. With the aim of reducing the size of the memory required for the storage of the vectors, the vectors associated with two states whose consecutive nodes are all different, are combined by formulating a combination vector resulting from the addition to the destination nodes of a first vector the destination nodes of another vector.

As will be described in detail below, when one vector cannot be combined with another, it is transformed through successive offsets and rotations until it can be combined. According to a characteristic of the invention, the transition vectors are combined with combination vectors previously initialized to zero.

In fact, two vectors can be combined if these vectors do not come into conflict. That is, if an AND logic operation between these values leads to a null result, that is, to a vector, all of whose components are null.

Stated otherwise, two vectors are in conflict if there exists at least one same bit equal to one in both vectors. This signifies that these two vectors lead to the same symbol or that one and the same state is being traversed. In such a case, these vectors may not be combined.

In the case when the AND logic operation allows the vectors to be combined, the combination is performed by carrying out an OR logic operation between the two vectors. When two vectors may not be combined, a transformation of one of the vectors is carried out until a configuration is obtained in which the two vectors do not have at least one bit in common equal to 1. This transformation consists of an offset and a rotation of the bits of the vectors. Thus, in one mode of implementation, a rightward offset of the bits of the vectors is carried out, the rightmost bit being transferred to the leftmost bit of the vector.

For example, an offset of three bits of a vector V may be written: $V \otimes 3$. Thus, we write for example:

$$101001 \otimes 3 = 110100 \otimes 2 = 011010 \otimes 1 = 001101$$

With the aim of reducing to the maximum the memory size required for the storage of the transition vectors, one seeks to combine to the maximum the vectors of all the states of the automaton.

During the formation of a combination vector, values of transition parameters T and S resulting from the transformations performed are allotted to each vector thus aggregated. While an arbitrary value of the parameter T is assigned to each combined vector, this combination vector is assigned a parameter S corresponding to the number of offsets performed to obtain a configuration allowing one vector to be combined with another.

An exemplary implementation of a vector aggregation in accordance with the invention will now be described with reference to FIGS. 7 to 16. With the aim of obtaining an optimal distribution of states, as visible in FIG. 6, the states are ranked as a function of their density and one seeks, first, to combine those states whose density is highest.

As indicated previously, empty combination vectors $AV_0$, $AV_1, \ldots, AV_m$, that is to say, all of whose bits are set to 0, are also formulated in sufficient number to be able to process the whole set of states. The following combination algorithm is then implemented, for an alphabet of 256 characters:

```
For each state S_i
    For each combination vector AV_j
        For each x in [0, ..., 255],
```

-continued $$\text{If } V_{Si} \otimes x \text{ AND } AV_j = 0$$
$$S := x$$
$$T := j$$
$$AV_j := AV_j \text{ OR } V_{Si} \otimes x$$
$$S := S = 1$$

in which $V_{si}$ designates a state vector associated with a state $S_i$.

Thus, for example, referring now to FIG. 7, one first combines the state vector associated with the initial state ϵ, and the first combination vector $AV_0$. The AND logic operation between these vectors leads to a null result so that the vectors $V_\epsilon$ and $AV_0$ are combined. The state transition values are T=0 and S=0. One then combines the vector $Vs_0$ associated with the state $S_0$ with one of the combination vectors.

With reference to FIG. 8, an attempt is made to aggregate the vector $Vs_0$ with the vector $AV_0$. To do this, one performs the AND logic operation between the vector $Vs_0$ and the combination vector $AV_0$. The result of this operation is non-null. One then performs successive rotations of the vector $Vs_0$ until a configuration is obtained in which this transformed vector can be combined with the combination vector $AV_0$. This configuration cannot be obtained.

With reference to FIG. 9, the vector $Vs_0$ is then combined with the next combination vector $AV_1$. The transition values are T=1 and S=0. Referring to FIG. 10, one next aggregates the vector $Vs_3$ with the first combination vector $AV_0$. As visible in this figure, this combination is impossible.

An attempt is then made to combine this vector $Vs_3$ with the combination vector $AV_1$. As represented in FIG. 11, a rotation of 1 bit of the vector $Vs_3$ makes it possible to obtain a configuration in which this transformed vector can be combined with the vector $AV_1$. The transition parameters become for this combination vector $AV_1$:T=1, S=1. Likewise, the transition vectors associated with the states of $S_1$ and $S_4$ are successively combined, in the order of descending densities (FIGS. 12 to 14).

As shown in FIG. 15, for each original state or parent state, the whole set of destination states or daughter states are illustrated. Each vector is associated with transition parameter values T and S obtained as a function of the transformations performed to carry out the combinations.

Referring finally to FIG. 16, the states are positioned in the memory as a function of the values of the transition parameters T and S. T corresponds to an offset within a segment Δ and S corresponds to an offset of the segments.

It will, however, be noted that the offset within a segment T corresponds to the value T of the parameter of an immediately earlier state. Moreover, a segment Δ to which a state belongs is equal to the symbol used to attain this state offset by the value S. For example, in the alphabet considered, $A_6 \oplus 6 = 4$.

That which is claimed:

1. A method of storing data in a memory circuit of an Aho-Corasick type character recognition automaton, the method comprising:
    storing a tree of nodes in a memory in which each node in the tree corresponds to a state of automaton; and
    operating a character recognition automation coupled to the memory circuit to perform the following
        recognizing character strings by implementing successive transitions in the tree of nodes in which each node in the tree corresponds to a state of the automaton;
        recognizing a sequence of each character string, with each node in the tree being associated with a transition vector used to determine at least one destination node of a transition in the tree of nodes;
        determining if transition vectors point to common destination addresses;
        combining the transition vectors to form a combination vector if the transition vectors do not point to a common destination address; and
        storing the nodes in the tree at memory addresses pointed to by the combination vector.

2. A method according to claim 1, wherein the combination vector is formed by carrying out a logic OR between the transition vectors to be combined.

3. A method according to claim 1, further comprising performing a test to determine if the transition vectors point to common states by carrying out an AND logic function between the transition vectors to be combined.

4. A method according to claim 1, wherein successive transformations of a first vector to be combined are carried out until a configuration of the first vector is obtained in which the states to which this vector points are different from the states to which a second vector to be combined points.

5. A method according to claim 4, wherein if the configuration is not attained, then the first vector is combined with another vector.

6. A method according to claim 4, wherein the transformation is an offset and a rotation of the bits of the vector.

7. A method according to claim 1, wherein each node in the tree is associated in the memory circuit with transition parameters used to form the transition vectors based on a transition function.

8. A method according to claim 7, wherein a value of the transition parameters is modified as a function of the successive transformations of the vectors.

9. A method according to claim 7, wherein the states are stored in the memory circuit as a set of segments of descriptors, each segment corresponding to an input symbol and being addressable by a first transition parameter and each vector being addressable by a second transition parameter representing the position of the vector in a segment.

10. A method according to claim 1, wherein each node in the tree is associated with a confirmation key having a set of coding bits corresponding to a parameter for verifying a transition.

11. A method according to claim 1, wherein a set of combination vectors is initialized by setting each bit of the vectors to 0, and each transition vector and each combination vector are combined successively.

12. A method of operating an Aho-Corasick type character recognition automaton circuit comprising:
    storing a tree of nodes in a memory in which each node in the tree corresponds to a state of the automaton; and
    operating a character recognition automation coupled to the memory to perform the following
        recognizing character strings by implementing successive transitions in the tree of nodes stored in the memory,
        recognizing a sequence of each character string, with each node in the tree being associated with a transition vector used to determine at least one destination node of a transition in the tree of nodes,
        determining if transition vectors point to common destination addresses,
        combining the transition vectors to form a combination vector if the transition vectors do not point to a common destination address, and storing the tree of nodes at memory addresses in the memory pointed to by the combination vector.

13. A method according to claim 12, wherein the combination vector is formed by carrying out a logic OR between the transition vectors to be combined.

14. A method according to claim 12, further comprising performing a test to determine if the transition vectors point to common states by carrying out an AND logic function between the transition vectors to be combined.

15. A method according to claim 12, wherein successive transformations of a first vector to be combined are carried out until a configuration of the first vector is obtained in which the states to which this vector points are different from the states to which a second vector to be combined points.

16. A method according to claim 15, wherein if the configuration is not attained, then the first vector is combined with another vector.

17. A method according to claim 15, wherein the transformation is an offset and a rotation of the bits of the vector.

18. A method according to claim 12, wherein each node in the tree is associated in the memory with transition parameters used to form the transition vectors based on a transition function.

19. A method according to claim 18, wherein a value of the transition parameters is modified as a function of the successive transformations of the vectors.

20. A method according to claim 18, wherein the states are stored in the memory as a set of segments of descriptors, each segment corresponding to an input symbol and being addressable by a first transition parameter and each vector being addressable by a second transition parameter representing the position of the vector in a segment.

21. A method according to claim 12, wherein each node in the tree is associated with a confirmation key having a set of coding bits corresponding to a parameter for verifying a transition.

22. A method according to claim 12, wherein a set of combination vectors is initialized by setting each bit of the vectors to 0, and each transition vector and each combination vector are combined successively.

23. An Aho-Corasick type character recognition automaton circuit comprising:
 a memory for storing a tree of nodes in which each node in the tree corresponds to a state of the automaton; and
 a character recognition automation coupled to said memory and configured for
  recognizing character strings by implementing successive transitions in the tree of nodes stored in said memory,
  recognizing a sequence of each character string, with each node in the tree being associated with a transition vector used to determine at least one destination node of a transition in the tree of nodes,
  determining if transition vectors point to common destination addresses, and
  combining the transition vectors to form a combination vector if the transition vectors do not point to a common destination address, and storing the nodes in the tree at memory addresses in said memory pointed to by the combination vector.

24. A circuit according to claim 23, wherein said character recognition automation forms the combination vector by carrying out a logic OR between the transition vectors to be combined.

25. A circuit according to claim 23, wherein said character recognition automation is configured for performing a test to determine if the transition vectors point to common states by carrying out an AND logic function between the transition vectors to be combined.

26. A circuit according to claim 23, wherein successive transformations of a first vector to be combined by said character recognition automation are carried out until a configuration of the first vector is obtained in which the states to which this vector points are different from the states to which a second vector to be combined points.

27. A circuit according to claim 26, wherein if the configuration is not attained, then the first vector is combined with another vector.

28. A circuit according to claim 26, wherein the transformation is an offset and a rotation of the bits of the vector.

29. A circuit according to claim 23, wherein said character recognition automation associates each node in the tree in said memory with transition parameters used to form the transition vectors based on a transition function.

30. A circuit according to claim 29, wherein a value of the transition parameters is modified as a function of the successive transformations of the vectors.

31. A circuit according to claim 29, wherein said character recognition automation stores the states in said memory as a set of segments of descriptors, each segment corresponding to an input symbol and being addressable by a first transition parameter and each vector being addressable by a second transition parameter representing the position of the vector in a segment.

32. A circuit according to claim 23, wherein said character recognition automation associates each node with a confirmation key having a set of coding bits corresponding to a parameter for verifying a transition.

33. A circuit according to claim 23, wherein said character recognition automation initializes a set of combination vectors by setting each bit of the vectors to 0, and each transition vector and each combination vector are combined successively.

* * * * *